(12) United States Patent
Fukatani et al.

(10) Patent No.: US 11,005,103 B2
(45) Date of Patent: May 11, 2021

(54) COMPOSITIONS FOR FORMING A POROUS INSULATING LAYER, ELECTRODE FOR NON-AQUEOUS ELECTROLYTE RECHARGEABLE BATTERY HAVING THE POROUS INSULATING LAYER, THE RECHARGEABLE BATTERY AND METHOD FOR MANUFACTURING THE ELECTRODE

(71) Applicant: Samsung SDI Co., Ltd., Yongin-si (KR)

(72) Inventors: Tomoyuki Fukatani, Yokohama (JP); Koji Hoshiba, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 248 days.

(21) Appl. No.: 16/181,266

(22) Filed: Nov. 5, 2018

(65) Prior Publication Data
US 2019/0140284 A1    May 9, 2019

(30) Foreign Application Priority Data

Nov. 8, 2017   (JP) .............................. JP2017-215830
Feb. 21, 2018  (JP) .............................. JP2018-029152
Aug. 10, 2018  (KR) ........................ 10-2018-0093968

(51) Int. Cl.
  *H01M 4/62*    (2006.01)
  *H01M 4/36*    (2006.01)
  (Continued)

(52) U.S. Cl.
  CPC .......... *H01M 4/628* (2013.01); *H01M 4/0404* (2013.01); *H01M 4/13* (2013.01);
  (Continued)

(58) Field of Classification Search
  CPC ...... H01M 4/366; H01M 4/621; H01M 4/622; H01M 4/628
  (Continued)

(56) References Cited

U.S. PATENT DOCUMENTS

2007/0072083 A1   3/2007  Ikuta et al.
2011/0129730 A1*  6/2011  Kasai .................. H01M 4/606
                                              429/213
(Continued)

FOREIGN PATENT DOCUMENTS

CN    106898721 A    6/2017
JP    10-289617 A    10/1998
(Continued)

OTHER PUBLICATIONS

Extended European Search Report for corresponding European Patent Application No. 18203711.9, dated Apr. 9, 2019, 7 pages.
(Continued)

*Primary Examiner* — James M Erwin
(74) *Attorney, Agent, or Firm* — Lewis Roca Rothgerber Christie LLP

(57) ABSTRACT

A composition for forming a porous insulating layer according to the present disclosure includes a solvent including an organic solvent, and an insulating inorganic particle. According to the present disclosure, a porous insulating layer prepared using the composition is positioned on an active material layer being on a main surface of a current collector, wherein the active material layer includes at least an active material capable of electrochemically intercalating and deintercalating lithium ions and an active material layer binder. A distance between Hansen solubility parameters of the active material layer binder and the organic solvent is greater than or equal to about 8.0 $(\mathrm{MPa})^{1/2}$.

13 Claims, 1 Drawing Sheet

(51) Int. Cl.
*H01M 10/0525* (2010.01)
*H01M 4/04* (2006.01)
*H01M 4/139* (2010.01)
*H01M 4/13* (2010.01)
*H01M 50/46* (2021.01)
*H01M 4/587* (2010.01)
*H01M 10/052* (2010.01)
*H01M 4/1393* (2010.01)
*H01M 4/133* (2010.01)

(52) U.S. Cl.
CPC .......... *H01M 4/139* (2013.01); *H01M 4/366* (2013.01); *H01M 4/621* (2013.01); *H01M 4/622* (2013.01); *H01M 10/0525* (2013.01); *H01M 50/46* (2021.01); *H01M 4/133* (2013.01); *H01M 4/1393* (2013.01); *H01M 4/587* (2013.01); *H01M 10/052* (2013.01)

(58) Field of Classification Search
USPC ........................................................ 429/215
See application file for complete search history.

(56) References Cited

U.S. PATENT DOCUMENTS

| | | |
|---|---|---|
| 2011/0206977 A1 | 8/2011 | Ikeda |
| 2013/0244116 A1 | 9/2013 | Watanabe et al. |
| 2014/0186682 A1 | 7/2014 | Koyama et al. |
| 2014/0287308 A1 | 9/2014 | Okada et al. |
| 2015/0050533 A1 | 2/2015 | Nam et al. |
| 2015/0243964 A1* | 8/2015 | Yu .................. H01M 4/131 429/233 |
| 2017/0033344 A1 | 2/2017 | Suzuki |
| 2018/0301736 A1* | 10/2018 | Hashiwaki .............. H01M 2/16 |

FOREIGN PATENT DOCUMENTS

| | | | |
|---|---|---|---|
| JP | 2002-251999 | A | 9/2002 |
| JP | 2005-174792 | A | 6/2005 |
| JP | 2008-226566 | A | 9/2008 |
| JP | 4524713 | B2 | 8/2010 |
| JP | 2015-37077 | A | 2/2015 |
| JP | 2015-88253 | A | 5/2015 |
| JP | WO2015/111663 | A1 | 7/2015 |
| JP | 6079238 | B2 | 2/2017 |
| JP | 2017-142931 | A | 8/2017 |
| KR | 10-2015-0020022 | A | 2/2015 |
| WO | WO 2013/136426 | A1 | 9/2013 |

OTHER PUBLICATIONS

Abbott, et al., "Hansen Solubility Parameters in Practice," Complete with eBook, software and data, 5th Edition, Nov. 2015, Published by Hansen-Solubility.com, 269 pages.

EPO Office Action dated Jan. 23, 2020, for corresponding European Patent Application No. 18203711.9 (4 pages).

Korean Office Action dated Oct. 15, 2020, issued in corresponding Korean Patent Application No. 10-2018-0093968, 6 pages.

Office Action dated Feb. 16, 2021, of the corresponding European Patent Application No. 18203711.9 (5 pages).

* cited by examiner

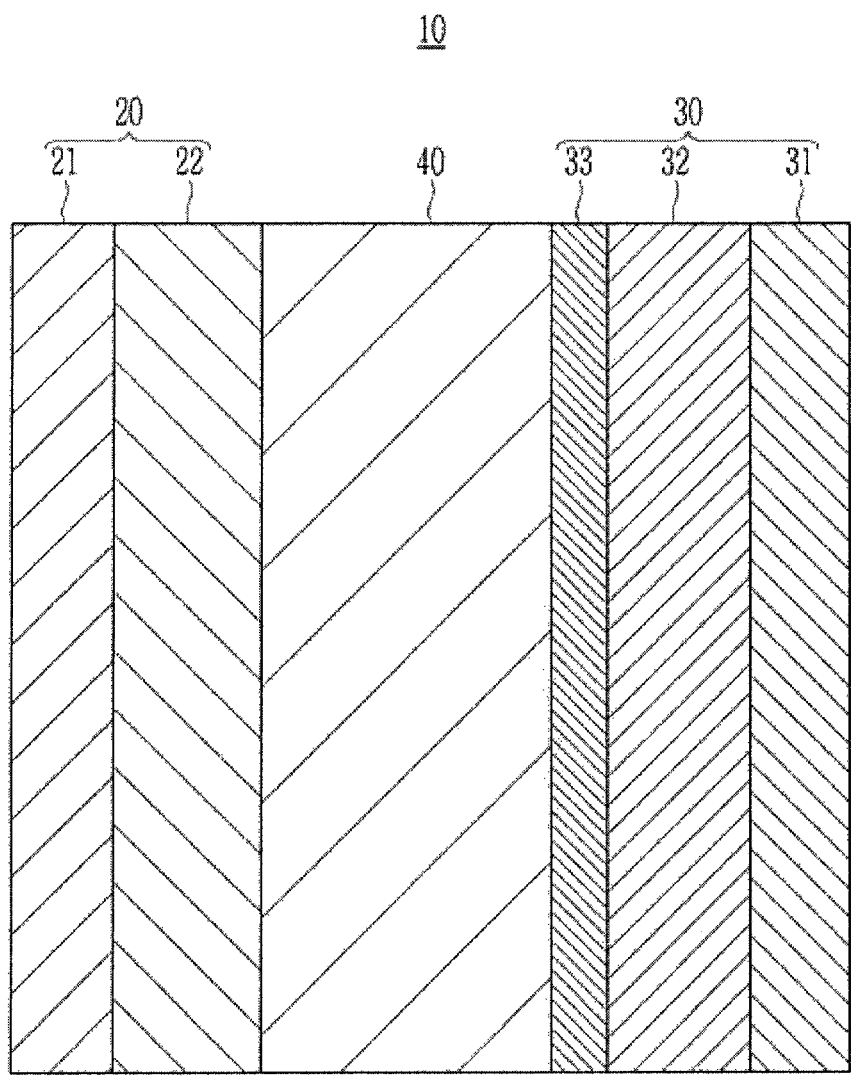

COMPOSITIONS FOR FORMING A POROUS INSULATING LAYER, ELECTRODE FOR NON-AQUEOUS ELECTROLYTE RECHARGEABLE BATTERY HAVING THE POROUS INSULATING LAYER, THE RECHARGEABLE BATTERY AND METHOD FOR MANUFACTURING THE ELECTRODE

CROSS-REFERENCE TO RELATED APPLICATION

This application claims priority to and the benefit of Japanese Patent Application Nos. 2017-215830 and 2018-029152 filed in the Japanese Patent Office on Nov. 8, 2017 and Feb. 21, 2018, respectively, and Korean Patent Application No. 10-2018-0093968 filed in the Korean Intellectual Property Office on Aug. 10, 2018, the entire content of each of which is incorporated herein by reference.

BACKGROUND

1. Field

One or more aspects of embodiments of the present disclosure are directed toward a composition for forming a porous insulating layer, an electrode for a non-aqueous electrolyte rechargeable battery, and a method for manufacturing the non-aqueous electrolyte rechargeable battery and the electrode for a non-aqueous electrolyte rechargeable battery.

2. Description of the Related Art

A non-aqueous electrolyte rechargeable battery is required (or desired) to have relatively high energy density and, also, secure safety. One method for achieving these characteristics has been to utilize a shutdown function of increasing internal resistance of the battery by closing pores of a separator through melting during abnormal overheating due to an internal short circuit of the battery and/or the like. In addition, a method of preventing the internal short circuit by forming a porous insulating layer directly on the surface of an electrode has been suggested, aside from (or in addition to) the shutdown function by the separator.

An electrode including this heat-resistance insulating layer (e.g., the porous insulating layer) may be, for example, manufactured as follows. First, an active material-containing paste as an aqueous slurry is coated on a current collector and then, dried and compressed to form an active material layer. On the active material layer, a material slurry for a porous insulating layer is coated and dried to form the porous insulating layer.

SUMMARY

In general, when the material slurry for a porous insulating layer is coated on the active material layer, a solvent included in the material slurry may expand the active material layer and thus may decrease density of the active material layer. For example, since the active material layer has pores after the compression, a part (some) of liquid components of the material slurry may permeate into the active material layer when the material slurry is coated. The permeated liquid components have an influence on constituting materials of the active material layer. The electrode after the compression has a residual stress, but the permeated liquid components have an influence on properties of the constituting materials of the active material layer such as elasticity and/or the like, and, consequently, may destroy a balance of the residual stress and partly cause a residual deformation and, thus, an increase in thickness of the active material layer. When the thickness of the active material layer is increased beyond a desired (or suitable) thickness, there may be a problem in inserting a battery device into an external case. When the active material layer includes a plurality of layers, each layer may show only a small thickness increase, but when the battery device is a stack structure formed by stacking a plurality of electrodes and a separator, or is a spirally-wound assembly formed by winding a long electrode, a total layer thickness increase of the plurality of active material layers may cause a problem of increasing a total thickness of the battery device.

This problem may be more serious when the active material layer is compressed with a larger pressure in order to manufacture a high energy density non-aqueous electrolyte rechargeable battery. For example, when design (or desired) electrode density (filling rate) of the active material layer is low (e.g., when an electrode having low electrode density is desired), the design electrode density of the active material layer may initially be set to be high, in advance of the compression of the electrode, by considering (taking into account) a thickness increase of the electrode after forming the porous insulating layer. However, since there has recently been a demand for higher energy density of a non-aqueous electrolyte rechargeable battery, the design electrode density becomes higher (e.g., an electrode having high electrode density is desired). In this case, the electrode may not be compressed up to a higher electrode density than the design electrode density of the active material layer. In addition, when non-oriented graphite particles, for example, are used as a negative active material in an effort to obtain a battery having a long cycle-life, a higher pressure needs to be applied during compression of the electrode. Since the compressed electrode bears a large residual stress and deformation, the thickness increase problem of the active material layer during coating and drying of the material slurry for a porous insulating layer becomes more noticeable (e.g., significant), and thus may be developed up to (may become) a production problem of not loading the electrode into an external case for a non-aqueous electrolyte rechargeable battery and/or the like.

One or more aspects of embodiments of the present disclosure are directed toward a composition for forming a porous insulating layer capable of suppressing or reducing a layer thickness increase of an active material layer of an electrode and a method for manufacturing an electrode for a non-aqueous electrolyte rechargeable battery.

One or more aspects of the present embodiments are directed toward an electrode for a non-aqueous electrolyte rechargeable battery manufactured by the method of the present embodiments, and toward a non-aqueous electrolyte rechargeable battery.

According to an embodiment, a composition for forming a porous insulating layer on an active material layer being on a main surface of a current collector, the active material layer including an active material capable of electrochemically intercalating and deintercalating lithium ions and an active material layer binder, includes a solvent and an insulating inorganic particle, the solvent including an organic solvent, wherein a distance between Hansen solubility parameters of the active material layer binder and the organic solvent is greater than or equal to about 8.0 (MPa)$^{1/2}$. A thickness increase of the electrode active material layer may be suppressed or reduced due to the porous insulating layer.

A distance between Hansen solubility parameters of the active material and the organic solvent may be greater than or equal to about 5.0 (MPa)$^{1/2}$. Within this range, a thickness increase of the electrode active material layer may be further suppressed or reduced.

In some embodiments, the distance between Hansen solubility parameters of the active material and the organic solvent may be greater than or equal to about 8.0(MPa)$^{1/2}$.

The organic solvent may have a distance (Ra) of the Hansen solubility parameter represented by Equation 1 of greater than or equal to about 5.0 (MPa)$^{1/2}$:

$$Ra = \{4 \times (18.0 - \delta_{D(solvent)})^2 + (9.3 - \delta_{P(solvent)})^2 + (7.7 - \delta_{H(solvent)})^2\}^{1/2}. \quad \text{Equation 1}$$

In Equation 1, $\delta_{D(solvent)}$ denotes dispersion force of the organic solvent in (MPa)$^{1/2}$, $\delta_{P(solvent)}$ denotes polarity force of the organic solvent in (MPa)$^{1/2}$, and $\delta_{H(solvent)}$ denotes a hydrogen bond force of the organic solvent in (MPa)$^{1/2}$.

In some embodiments, the composition for forming the porous insulating layer may further include a porous insulating layer binder. In this case, the porous insulating layer may be desirably (or suitably) formed.

In some embodiments, the solvent may include water. In this case, dispersion of the insulating inorganic particle may be improved.

In some embodiments, a boiling point of the organic solvent at 1 atm may be greater than or equal to about 160° C. Within this range, changes in properties of the composition for forming the porous insulating layer may be suppressed or reduced.

In some embodiments, the organic solvent may include an alcohol-based compound. The alcohol-based compound may disperse the insulating inorganic particle and a polyolefin-based polymer particle included in the composition for forming the porous insulating layer, and may dissolve the porous insulating layer binder, and thus a thickness increase of an active material layer of an electrode may be suppressed or reduced.

In some embodiments, the organic solvent may include a glycol alkyl ether-based compound. The glycol alkyl ether-based compound may disperse the insulating inorganic particle and the polyolefin-based polymer particle and may dissolve the porous insulating layer binder, and thus a thickness increase of an active material layer of an electrode may be suppressed or reduced.

The composition for forming the porous insulating layer may further include a polyolefin-based polymer particle. In this case, stability of the non-aqueous electrolyte rechargeable battery may be improved.

According to another embodiment, an electrode for a non-aqueous electrolyte rechargeable battery includes a current collector, an active material layer on a main surface of a current collector, and a porous insulating layer formed by utilizing the composition for forming the porous insulating layer on the active material layer, wherein the active material layer includes at least an active material capable of electrochemically intercalating and deintercalating lithium ions and an active material layer binder. In this case, a thickness increase of the active material layer of the manufactured electrode for a non-aqueous electrolyte rechargeable battery may be suppressed or reduced.

According to another embodiment, a non-aqueous electrolyte rechargeable battery includes the electrode for a non-aqueous electrolyte rechargeable battery according to the present embodiments. In this case, a thickness increase of the active material layer of the manufactured non-aqueous electrolyte rechargeable battery may be suppressed or reduced.

According to another embodiment, a method for manufacturing an electrode for a non-aqueous electrolyte rechargeable battery includes forming a porous insulating layer on an active material layer being on a main surface of a current collector, by utilizing a composition for forming a porous insulating layer, wherein the active material layer includes at least an active material capable of electrochemically intercalating and deintercalating lithium ions and an active material layer binder, the composition for forming the porous insulating layer includes at least a solvent and an insulating inorganic particle, the solvent including an organic solvent, and a distance between Hansen solubility parameters of the active material layer binder and the organic solvent is greater than or equal to about 8.0 (MPa)$^{1/2}$. In this case, when the non-aqueous electrolyte rechargeable battery is charged and discharged at a high temperature and at a high voltage, cycle-life may be improved.

As described above, according to the present disclosure, an increase in thickness of an electrode for the non-aqueous electrolyte rechargeable battery may be suppressed or reduced.

BRIEF DESCRIPTION OF THE DRAWING

These and/or other aspects will become apparent and more readily appreciated from the following description of the embodiments, taken in conjunction with the accompanying drawing.

The drawing is a schematic view showing a structure of a non-aqueous electrolyte rechargeable battery according to an embodiment of the present disclosure.

DETAILED DESCRIPTION

Hereinafter, referring to the drawing, example embodiments are illustrated in more detail. Elements having substantially the same functional structure in the present specification and the drawing are assigned the same numeral and will not be repetitively illustrated.

Composition for Forming Porous Insulating Layer

A composition for forming a porous insulating layer according to an embodiment is described. The composition may be used for forming a porous insulating layer on an active material layer of an electrode for a non-aqueous electrolyte rechargeable battery, and may include at least a solvent (including an organic solvent) and an insulating inorganic particle, and a material for forming the porous insulating layer, for example, a binder.

Solvent

As described above, the composition for forming the porous insulating layer according to the present embodiments includes a solvent including an organic solvent. A Hansen solubility parameter (hereinafter "HSP") distance between HSP of the binder of the active material layer (active material layer binder) and HSP of the organic solvent (hereinafter "a first HSP distance") may be greater than or equal to about 8.0 (MPa)1/2.

When the distance between the HSP of the organic solvent included in the composition for forming the porous insulating layer and the HSP of the active material layer binder satisfies the above relationship, swelling of the active material layer may be prevented or reduced, and thus a thickness increase of an active material layer of an electrode may be suppressed or reduced, even when the composition for forming the porous insulating layer is coated on the active material layer.

When the active material layer is compressed to adjust density, it bears a residual stress. Nevertheless, the active material layer maintains a stable shape, for the residual stress therein is balanced. However, when an organic solvent used in a comparable composition for forming a porous insulating layer has a first HSP distance that does not satisfy the range of the present embodiments, an active material layer binder may be expanded. As a result, elasticity of the active material layer binder is significantly deteriorated, a residual stress in the active material layer is unbalanced, and, consequently, a residual deformation occurs in a way of increasing a thickness of the active material layer. In contrast, in the present embodiments, the organic solvent has the recited first HSP distance relationship. Accordingly, when the composition for forming the porous insulating layer is coated on the active material layer, the swelling of the active material layer binder is suppressed or reduced, and, resultantly (or consequently), the residual deformation of the active material layer is suppressed or reduced, and thus the layer thickness increase may be suppressed or reduced.

As used herein, HSP is induced with a regular solution theory and an extended concept of dividing a Hildebrand's solubility parameter (SP) required (e.g., calculated) from evaporation of latent heat and density of a material into three components of polarity force ($\delta_P$), a hydrogen bond force ($\delta_H$), and dispersion force ($\delta_D$). This is expressed as one point in a three-dimensional space. Accordingly, the first HSP distance is obtained by comparing HSP's of the active material layer binder and the organic solvent as a distance between two points (an HSP distance) in the three-dimensional space as shown in Equation 2. In the present specification, HSP, a distance between HSP's, and each component (polarity force $\delta_P$, a hydrogen bond force $\delta_H$, and dispersion force $\delta_D$) are marked (stated) based on a unit of measurement of $(MPa)^{1/2}$, unless otherwise defined.

$$\text{HSP distance}=\{4\times(\delta_{D(binder)}-\delta_{D(solvent)})^2+(\delta_{P(binder)}-\delta_{P(solvent)})^2+(\delta_{H(binder)}-\delta_{H(solvent)})^2\}^{1/2} \quad \text{Equation 2}$$

In Equation 2, $\delta_{D(binder)}$ denotes dispersion force of the active material layer binder, $\delta_{D(solvent)}$ denotes dispersion force of the organic solvent, $\delta_{P(binder)}$ denotes polarity force of the active material layer binder, $\delta_{P(solvent)}$ denotes polarity force of the organic solvent, $\delta_{H(binder)}$ denotes a hydrogen bond force of the active material layer binder, and $\delta_{H(solvent)}$ denotes a hydrogen bond force of the organic solvent.

An upper limit of the first HSP distance is not particularly limited, and may be less than or equal to 30 $(MPa)^{1/2}$ in a general solvent (e.g., in a total solvent composition).

When a plurality of organic solvents is mixed, an HSP of the mixed solvent is calculated from the HSP and a volume mixing ratio of each organic solvent, and a distance between the HSP of the mixed solvent and the HSP of the active material layer binder (a first HSP distance) may be greater than or equal to 8.0 $(MPa)^{1/2}$. The HSP of the mixed solvent may be obtained by applying a weight value of each volume mixing ratio to a point of each solvent disposed in a three-dimensional space of HSP and then, calculating a mass center thereof.

In embodiments where a plurality of active material layer binders are included in the active material layer, the organic solvent may satisfy the first HSP distance with the active material layer binders included in an amount of greater than or equal to about 45 wt %, greater than or equal to about 50 wt %, for example, greater than or equal to about 70 wt % and less than or equal to about 100 wt %, based on a total weight of the active material layer binder. In some embodiments, the organic solvent may satisfy the first HSP distance relationship with all of the active material layer binders in the active material layer. Accordingly, swelling of the active material layer may be prevented (or reduced).

In addition, a distance between the HSP of the active material of the active material layer and the HSP of the organic solvent (hereinafter, a "a second HSP distance") may be greater than or equal to 5.0 $(MPa)^{1/2}$, for example, greater than or equal to 8.0 $(MPa)^{1/2}$. An upper limit of the second HSP distance is not particularly limited, and may be less than or equal to 20 $(MPa)^{1/2}$ in a general solvent except for water (e.g., in a total solvent composition not including water). Accordingly, a layer thickness increase of the active material layer may be suppressed or reduced.

The active material in the active material layer is mainly (primarily) bound by the active material layer binder, but a friction generated in the active material may have an influence on a residual stress balance of the active material layer and/or on maintenance of a layer thickness of the active material layer. When the second HSP distance satisfies the range of the present embodiments, an interaction with the surface of the active material, permeation of the active material and the binder on the bonding interface, and permeation of the organic solvent into internal pores may be suppressed or reduced, and as a result, the friction among the active materials may be reduced, and/or the active material and the binder may be suppressed (or reduced) from peeling on the interface, and accordingly, the layer thickness increase of the active material layer may be significantly reduced.

In some embodiments, the second HSP distance is calculated in the same way as the first HSP distance is calculated except for using the HSP of the active material instead of the HSP of the active material layer binder. When a plurality of organic solvents is mixed in the composition for forming the porous insulating layer, the second HSP distance is calculated in the same way as the first HSP distance is calculated except for using the HSP of the active material instead of the HSP of the active material layer binder.

In embodiments where a plurality of active materials are included in the active material layer, the organic solvent may satisfy the second HSP distance when being used in an amount of greater than or equal to 45 wt %, greater than or equal to 50 wt %, for example, greater than or equal to 70 wt % based on a total weight of the active material, and thus may satisfy the second HSP distance when included in an amount of less than or equal to 100 wt %, based on a total weight of the active material. In some embodiments, the organic solvent may satisfy the second HSP distance relationship with all of the active materials in the active material layer, and thus the swelling of the active material layer may be prevented or reduced.

An HSP of each solvent may be obtained by using, for example, a software database of Hansen Solubility Parameter in Practice (4th Edition) and/or the like.

The HSP of the active material layer binder may be obtained as follows. The active material layer binder (dry solid state) is dipped in a solvent having a known HSP to measure a weight swelling degree regarding each solvent. The solvent used herein may be a hydrophilic solvent and/or a hydrophobic solvent such as dimethyl sulfoxide, acetonitrile, dimethyl formamide, methanol, ethanol, 1-butanol, 1,4-dioxane, tetrahydrofuran, toluene, methyl ethyl ketone, acetone, N-methyl-2-pyrrolidone, n-hexane, cyclohexane, methyl isobutyl ketone, n-butyl acetate, chloroform, methyl acetate, pyridine, hexafluoro isopropanol, diethylene glycol, γ-butyrolactone, 2-amino ethanol, cyclo hexanone, 1,1,2,2-tetrabromo ethane, 1-bromo naphthalene, and/or aniline, which may be used in a mixture of two or more. Each solvent may be classified into a "swelling solvent" (a solvent having the weight swelling degree of greater than or equal to about 3.0) or a "non-swelling solvent" (a solvent having the weight swelling degree of less than 3.0). Regarding each solvent used in a test of disposing each solvent in a HSP three-dimensional space, a sphere including points of solvents classified as a "swelling solvent" and not including points of solvents classified as a "non-swelling solvent" is mapped out. When a radius of the sphere is maximized, a central coordinate of the sphere is regarded as an HSP of the active material layer binder.

When an HSP of the active material layer binder is difficult to experimentally obtain, the HSP may be obtained based on a reference value available in the art. In embodiments where the document value of the HSP of the active material is difficult to obtain, a reference value of a compound corresponding to the active material may be used instead. For example, the HSP may be obtained based on a reference value of graphene described in Langmuir, 2008, 24; pp.10560-4. Referring to the article, graphene has dispersion force ($\delta_D$) of 18.0 (MPa)$^{1/2}$, polarity force ($\delta_P$) of 9.3 (MPa)$^{1/2}$, and a hydrogen bond force ($\delta_H$) of 7.7 (MPa)$^{1/2}$. Accordingly, the organic solvent may have an HSP distance (Ra) of greater than or equal to 5.0 (MPa)$^{1/2}$, for example, greater than or equal to 8.0 (MPa)$^{1/2}$ as calculated using Equation 1. Therefore, a layer thickness increase of the active material layer may be suppressed or reduced.

$$Ra = \{4 \times (18.0 - \delta_{D(solvent)})^2 + (9.3 - \delta_{P(solvent)})^2 + (7.7 - \delta_{H(solvent)})^2\}^{1/2} \quad \text{Equation 1}$$

In Equation 1, $\delta_{D(solvent)}$ denotes dispersion force of the organic solvent, $\delta_{P(solvent)}$ denotes polarity force of the organic solvent, and $\delta_{D(solvent)}$ denotes a hydrogen bond force of the organic solvent.

In some embodiments, the organic solvent may include any solvent satisfying the HSP relationship, including the first HSP distance relationship, without a particular limit, and may be, for example, an organic solvent such as a glycol alkyl ether-based compound, an alcohol-based compound, and/or the like. When the organic solvent satisfies the first HSP distance relationship with an active material layer binder, it may be effectively (e.g., suitably) used in terms of dispersion of insulating inorganic particles and/or dissolution of a porous insulating layer binder (described herein below). For example, when an alcohol-based compound is used as the organic solvent, the first HSP distance and the second HSP distance may be simultaneously (or concurrently) increased. In some embodiments, the organic solvent may be used as a single solvent alone or as a mixture of two or more.

The alcohol-based compound may have, for example, 3 to 10 carbon atoms (C3 to C10), for example, 4 to 8 carbon atoms (C4 to C8), and may be a linear or branched lower alkyl alcohol or aliphatic alcohol that is unsubstituted or substituted with an alkoxy group. The alcohol-based compound may be, for example, 2-propanol, 1-butanol, 1-pentenol, 1-hexanol, 1-heptanol, 1-octanol, 2-methyl-1-pentenol, 2-ethyl-1-pentenol, 2-methyl-1-hexanol, 2-ethyl-1-hexanol, 2-methyl-1-heptanol, 2-ethyl-1-heptanol, 2-propyl-1-heptanol, 1-methoxy-2-propanol, 3-methoxy-3-methyl-1-butanol, 3-ethoxy-3-methyl-1-butanol, 3-methoxy-3-methyl-1-pentenol, 3-ethoxy-3-methyl-1-pentenol, 1-nonanol, 1-decanol, and/or the like, and in some embodiments, the alcohol-based compound may be 1-butanol, 1-hexanol, 2-ethyl-1-hexanol, and/or 3-methoxy-3-methyl-1-butanol, for example, 2-ethyl-1-hexanol and/or 3-methoxy-3-methyl-1-butanol.

When the alcohol-based compound is substituted with an alkoxy group, the carbon number of the alkoxy group is not particularly limited, and may be 1 to 4, 1 to 3, for example, 1 or 2.

In some embodiments, the alcohol-based compound may be monovalent alcohol and/or polyhydric alcohol. For example, he alcohol-based compound may be monovalent alcohol. Accordingly, a thickness increase of the active material layer may be further suppressed or reduced.

The glycol alkyl ether-based compound may be monoalkylene glycol monoalkyl ether (such as ethylene glycol monomethyl ether, ethylene glycol monoethyl ether and/or the like), dialkylene glycol monoalkyl ether (such as diethylene glycol monomethyl ether, diethylene glycol monoethyl ether, and/or the like), trialkylene glycol monoalkyl ether (such as triethylene glycol monomethyl ether, triethylene glycol monoethyl ether, and/or the like), and/or any suitable alkylene glycol monoalkyl ether having a polymerization degree of 3 or greater, and may be, for example, triethylene glycol monomethyl ether, diethylene glycol monomethyl ether, and/or ethylene glycol monoethyl ether.

The carbon number of the alkoxy group of the glycol alkyl ether-based compound may not be particularly limited, and may be 1 to 4, 1 to 3, for example 1 or 2.

The glycol alkyl ether-based compound may include an ethylene glycol backbone.

A boiling point of the organic solvent may be, for example, greater than or equal to about 100° C., and in some embodiments, greater than or equal to about 130° C. and less than or equal to about 250° C. Accordingly, during formation of the porous insulating layer, volatilization of the solvent and viscosity changes caused thereby may be prevented or reduced, and the porous insulating layer having a uniform (or a substantially uniform) thickness may be formed.

The solvent may include water. The water has excellent solubility for the active material layer binder of the active material layer and may be appropriate for dissolution and dispersion of each material of the composition for forming the porous insulating layer. An amount of the water in the solvent may be less than or equal to about 70 wt %, for example, less than or equal to about 50 wt % based on the solvent (e.g., total weight of the solvent).

In the composition for forming the porous insulating layer, an amount of the solvent is not particularly limited, and may be selected according to desirable (or suitable) preparation conditions. In some embodiments, the amount may be greater than or equal to about 15 wt % and less than or equal to about 60 wt %, for example, greater than or equal to about 20 wt % and less than or equal to about 45 wt %.

Insulating Inorganic Particle

The composition for forming the porous insulating layer may include an insulating inorganic particle. In some embodiments, the insulating inorganic particle is a solid main component of the composition for forming the porous insulating layer. The insulating inorganic particle ensures (improves) insulation properties between the separator and the active material layer and prevents or reduces the risk of internal short-circuit.

The insulating inorganic particle is not particularly limited, and may be, for example, oxide particles (such as iron oxide, silica ($SiO_2$), alumina ($Al_2O_3$), $TiO_2$, $BaTiO_2$, ZrO, and/or the like), nitride particles (such as boron nitride, aluminum nitride, silicon nitride, and/or the like), sparingly soluble ion crystalline particles (such as calcium fluoride, barium fluoride, barium sulfate, and/or the like), covalent bond-type (or kind) crystalline particles (such as silicon, diamond, and/or the like), clay particles (such as montmorillonite, and/or the like), materials derived from minerals (such as boehmite, zeolite, apatite, kaolin, mullite, spinel, olivine, and/or the like), and/or artificial or synthetic products of any if these materials. In some embodiments, conductive particles of metal particles, oxide particles (such as $SnO_2$, tin-indium oxide (ITO), and/or the like), and/or carbonaceous particles (such as carbon black, graphite and/or the like), which are surface-treated with materials having electrical insulation properties, may be particulates having electrical insulation properties.

An average particle diameter of the insulating inorganic particles is not particularly limited and may be, for example, greater than or equal to about 0.01 μm and less than or equal to about 5 μm, and in some embodiments, greater than or equal to about 0.1 μm and less than or equal to about 1 μm. In the present specification, the average particle diameter may refer to a volume-based cumulative frequency D50 particle diameter, and the average particle diameter may be measured by a laser diffraction•scattering-type particle distribution meter.

An amount of the insulating inorganic particle in the composition for forming the porous insulating layer may be, for example, greater than or equal to about 20 wt % and less than or equal to about 98 wt %, and in some embodiments, greater than or equal to about 30 wt % and less than or equal to about 95 wt %, based on a solid content of the composition for forming the porous insulating layer.

Binder

The composition for forming the porous insulating layer may include a binder (herein referred to as a "porous insulating layer binder"). The porous insulating layer binder is not particularly limited and one or more binders suitable for application in the porous insulating layer may be utilized.

The porous insulating layer binder may be, for example, a polymer or a copolymer of a vinyl group-containing monomer. The vinyl group-containing monomer is not particularly limited, and may be ethylene; acrylic acid, methacrylic acid and/or (meth)acrylate salt; acrylonitrile; vinyl alcohol; vinyl ester (such as vinyl acetate, vinyl pyropionate, vinyl butyrate, and/or the like); (meth)acrylic acid ester (such as isobornyl (meth)acrylate, 2-ethylhexyl (meth)acrylate, methoxyethyl (meth)acrylate, and/or the like); styrene, and/or the like.

The porous insulating layer binder may include a polymer Q including at least one monomer unit (A) represented by Chemical Formula 1:

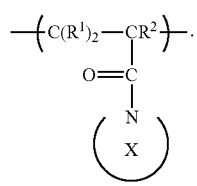

Chemical Formula 1

In Chemical Formula 1, $R^1$ and $R^2$ may each independently be a hydrogen atom or C1 to C3 alkyl group; and the ring X may be a heterocyclic group having at least one nitrogen atom as a ring-forming atom, wherein at least one hydrogen of the ring X may be substituted by a C1 to C3 alkyl group.

The polymer Q including the monomer unit (A) may be easily dissolved in the solvent, for example, in the glycol alkyl ether-based compound. In addition, elasticity of the polymer Q is improved due to the monomer unit (A) and thus a rigid porous insulating layer may suitably be formed.

In $R^1$ and $R^2$, the C1 to C3 alkyl group may be a methyl group, an ethyl group, an n-propyl group, or an isopropyl group. In some embodiments, $R^1$ and $R^2$ may each independently be a hydrogen atom or a methyl group, for example, $R^1$ and $R^2$ may both be a hydrogen atom.

The ring X may be, for example, a heterocyclic group including a nitrogen atom (such as a pyrazolyl group, a pyrazolidinyl group, and/or the like), and/or a heterocyclic group including a nitrogen atom and an oxygen atom (such as a morpholinyl group and/or the like). In some embodiments, the ring X may be a heterocyclic group including a nitrogen atom and an oxygen atom, for example, a morpholinyl group.

The number of the ring component constituting the ring X (e.g., the number of ring-forming carbon atoms in the ring X) is not particularly limited, and may be, for example, 4 to 10, for example, 4 to 7. At least one hydrogen atom of the ring X may be replaced (substituted) by a C1 to C3 alkyl group, for example, a methyl group, an ethyl group, an n-propyl group, and/or an isopropyl group.

In some embodiments, all of the hydrogen atoms in the ring X may not be replaced (the ring X may be unsubstituted).

An amount of a monomer unit (A) in the polymer Q is not particularly limited, and may be included, for example, in an amount of greater than or equal to 20 wt %, for example, in a range of greater than or equal to 40 wt % and less than or equal to 98 wt %. Accordingly, the polymer Q may be more easily dissolved in the aforementioned solvent, for example, in a glycol ether-based compound.

The polymer Q may also include at least one selected from a monomer unit (B) represented by Chemical Formula 2 and a monomer unit (C) represented by Chemical Formula 3. The monomer unit (B) and the monomer unit (C) may be included in the polymer Q respectively alone or as a mixture of two or more.

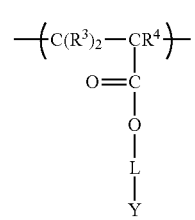

Chemical Formula 2

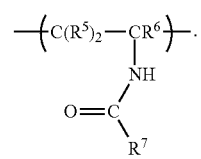

Chemical Formula 3

In Chemical Formulae 2 and 3, $R^3$ to $R^7$ may each independently be a hydrogen atom or a C1 to C3 alkyl group; L may be a divalent linking group; Y may be a heterocyclic group having an oxygen atom as at least one ring component (ring-forming atom), wherein at least one hydrogen atom in Y may be replaced (substituted) by a C1 to C3 alkyl group.

When the polymer includes at least one monomer unit (B) represented by Chemical Formula 2, the polymer Q may easily be dissolved in the glycol ether-based compound.

In $R^3$ and $R^4$ of Chemical Formula 2, the C1 to C3 alkyl group may be a methyl group, an ethyl group, an n-propyl group, and/or an isopropyl group. In some embodiments, $R^3$ and $R^4$ may each independently be a hydrogen atom or a methyl group, and in some embodiments, $R^3$ and $R^4$ may both be a hydrogen atom.

L may be a single bond or a divalent linking group, for example, a C1 to C5 alkylene group, a polyoxy ethylene group, and/or the like. The C1 to C5 alkylene group may be a methylene group, an ethylene group, a propylene group, a butylene group, and/or a propylene group. One or more hydrogen atoms of the C1 to C5 alkylene group may be replaced (substituted) by a C1 to C3 alkyl group, for example, a methyl group, an ethyl group, an n-propyl group, and/or an isopropyl group.

Y may be, for example, an unsaturated heterocyclic group including an oxygen atom (such as a furanyl group, a pyranyl group, a 2,5-dihydro furanyl group, and/or the like), a saturated heterocyclic group including an oxygen atom (such as a tetrahydrofuranyl group, a tetrahydro pyranyl group, a dioxan-yl group, and/or the like), and/or a heterocyclic group including a nitrogen atom and an oxygen atom (such as a morpholinyl group, and/or the like). In the compound, ring Y may be a saturated heterocyclic group including an oxygen atom, for example, a tetrahydrofuranyl group. The number of the ring component constituting Y (e.g., the number of ring-forming atoms in Y) is not particularly limited, and may be, for example 4 to 10, for example, 4 to 7.

At least one hydrogen atom of the ring Y may be replaced (substituted) by a C1 to C3 alkyl group, for example, a methyl group, an ethyl group, an n-propyl group, and/or an isopropyl group. In some embodiments, all of the hydrogen atoms in the ring Y may not be replaced (Y may be unsubstituted).

In some embodiments, the monomer unit (A) and the monomer unit (B) may be mixed in a weight ratio (A)/(B) of 50/50 to 100/0 in the polymer Q. Accordingly, when the solvent includes a glycol ether-based compound, the polymer Q may be more easily dissolved in the solvent.

In embodiments where the polymer Q includes at least one monomer unit (C), dispersion of insulating inorganic particles and/or binding properties with the active material layer may be improved. In addition, when the polymer Q includes at least one monomer unit (C), and the composition for forming the porous insulating layer includes polyolefin-based polymer particles, the polyolefin-based polymer particles may easily maintain a stable dispersion state in the composition.

In $R^5$ to $R^7$ of Chemical Formula 3, the C1 to C3 alkyl group may be a methyl group, an ethyl group, an n-propyl group, and/or anisopropyl group. For example, $R^5$ to $R^7$ may each independently be a hydrogen atom or a methyl group, for example, $R^5$ to $R^7$ may both be a hydrogen atom.

In some embodiments, the monomer unit (A) and the monomer unit (C) are used in a mass ratio (A)/(C) of 40/60 to 60/40. Accordingly, binding properties of the porous insulating layer binder and dispersion of the polyolefin-based polymer particles may be improved.

In some embodiments, the polymer Q may include an ionic monomer unit.

In embodiments where the composition for forming the porous insulating layer includes no polyolefin-based polymer particles, the ionic monomer unit may be included in an amount of greater than or equal to 0.5 wt % and less than or equal to 50 wt %, for example, greater than or equal to 2 wt % and less than or equal to 30 wt %. Accordingly, dispersion of the insulating inorganic particles and/or binding properties with the active material layer may be significantly improved. When the composition for forming the porous insulating layer includes the polyolefin-based polymer particles, an amount of the ionic monomer unit may be in a range of greater than or equal to 2 wt % and less than or equal to 5 wt %. Accordingly, dispersion stability of the polyolefin-based polymer particles is sufficiently (or suitably) maintained.

The ionic monomer unit, for example, may refer to a monomer unit having a functional group capable of causing a positive charge or a negative charge due to ionization and/or the like in a solvent including water. The ionic monomer unit is not particularly limited and may be, for example, a monomer unit (D) represented by Chemical Formula 4:

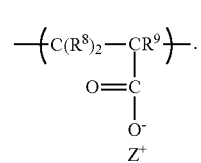

Chemical Formula 4

In Chemical Formula 4, $R^8$ and $R^9$ may each independently be a hydrogen atom or a C1 to C3 alkyl group; $Z^+$ may be a monovalent cation group, and $Z^+$ and $O^-$ may form an ion bond. In $R^8$ and $R^9$ of Chemical Formula 4, the C1 to C3 alkyl group may be a methyl group, an ethyl group, an n-propyl group, and/or an isopropyl group. In some embodiments, $R^8$ and $R^9$ may each independently be a hydrogen atom or a methyl group, for example, $R^8$ and $R^9$ may both be a hydrogen atom.

$Z^+$ may be, for example, an inorganic cation (such as a proton, an ammonium ion, an organic cation, and/or a metal ion), and/or a metal complex compound. The organic cation may be a cation of amines. The amines may be any suitable primary, secondary, or tertiary amines. For example, amines may be aliphatic amines (such as methyl amine, dimethyl amine, triethyl amine, monoethanol amine, diethanol amine, triehanol amine, ethylenediamine, N,N-diisopropyl ethyl amine, hexamethylene diamine and/or the like), aromatic amines (such as aniline and/or the like), and/or non-aromatic heterocyclic amines (such as pyrrolidine, piperidine, piperazine, morpholine, pyridine, pyridazine, pyrimidine, pyrazine, oxazole, thiazole, and/or the like).

In some embodiments, the polymer Q may include a monomer unit other than those described above.

In some embodiments, an amount sum (e.g., total amount) of the monomer units (A), (B), and (C) in the polymer Q may be, for example, greater than or equal to 50 wt %, for example, greater than or equal to 70 wt %, and in some embodiments, greater than or equal to 95 wt %, based on a total amount of the polymer Q.

Bonding methods of the copolymer and the polymer included in the porous insulating layer binder are not particularly limited, and the polymer may be a random copolymer, an alternating copolymer, a periodic copolymer, a block copolymer, and/or a graft copolymer. Weight average molecular weights of the copolymer and the polymer included in the porous insulating layer binder are not particularly limited, and may be, for example, greater than or equal to about 50,000 and less than or equal to about 2,000,000 and in some embodiments, greater than or equal to about 100,000 and less than or equal to about 1,000,000. The weight average molecular weight may be measured through gel permeation chromatography of converting polyethylene oxide (PEO) into a standard material.

An amount of the porous insulating layer binder in the composition for forming the porous insulating layer may be, for example, greater than or equal to about 2 wt % and less than or equal to about 10 wt %, and in some embodiments, greater than or equal to about 3 wt % and less than or equal to about 7 wt %, based on a solid content of the composition for forming the porous insulating layer.

Polyolefin-Based Polymer Particle

In some embodiments, the composition for forming the porous insulating layer may include a polyolefin-based polymer particle. The polyolefin-based polymer particle has a relatively low melting point, and thus it may be molten (melted) and may block or reduce the transport of lithium ions at the time of abnormal heating of a non-aqueous electrolyte rechargeable battery. Accordingly, stability of the non-aqueous electrolyte rechargeable battery may be improved.

The polyolefin-based polymer particle may be for example a polyethylene-based polymer particle, a polypropylene-based polymer particle, and/or the like.

An average particle diameter of the polyolefin-based polymer particle is not particularly limited, and may be, for example, greater than or equal to about 0.5 μm, greater than or equal to about 4 μm, or greater than or equal to about 0.7 μm and less than or equal to about 2 μm. In some embodiments, the porous insulating layer may be formed as a relatively thin (for example, less than or equal to about 4 μm) film. Accordingly, the average particle diameter of the polyolefin-based polymer particle needs to be relatively small. When the polyolefin-based polymer particle has a small particle diameter, it may relatively be difficult for it to be dispersed. However, when the polymer including monomer units (A) and (B) is used as a binder, the polyolefin-based polymer particle may be uniformly dispersed in the porous insulating layer.

An amount of the polyolefin-based polymer particle of the composition for forming the porous insulating layer may be, for example, greater than or equal to about 20 wt % and less than or equal to about 80 wt %, based on a solid content of the composition for forming the porous insulating layer.

The composition for forming the porous insulating layer (using an organic solvent having an HSP distance of greater than or equal to 8.0 $(MPa)^{1/2}$ from a binder of the active material layer) may be suppressed or reduced from swelling (e.g., from increasing the thickness) of the active material layer, even when coated on the active material layer.

Structure of Non-Aqueous Electrolyte Rechargeable Battery

Hereinafter, referring to the drawing, a structure of a non-aqueous electrolyte rechargeable battery 10 according to an embodiment of the present disclosure is described. The drawing is a schematic view showing a structure of a non-aqueous electrolyte rechargeable battery according to an embodiment. The non-aqueous electrolyte rechargeable battery 10 includes a negative electrode 30, which may be the electrode on which the porous insulating layer of the present embodiments is formed.

The non-aqueous electrolyte rechargeable battery 10 of the drawing is an example of a rechargeable battery according to the present embodiment. As shown in the drawing, the non-aqueous electrolyte rechargeable battery 10 includes a positive electrode 20, a negative electrode 30, and a separator layer 40. The shape of the non-aqueous electrolyte rechargeable battery 10 is not particularly limited, and it may be, for example, cylindrical, prismatic, laminate-type (or kind), button-type (or kind), and/or the like.

The positive electrode 20 includes a current collector 21 and a positive active material layer 22 disposed (e.g., positioned) on a main surface of the current collector 21. The current collector 21 may use any suitable conductor, and may be, for example, aluminum (Al), stainless steel, and/or nickel-plated steel.

In the present specification, a "main surface" may refer to a surface having a larger area than the other surfaces among all the surfaces of a given element (e.g., thin plate). For example, the main surface in the current collector 21 may refer to a first large surface and/or a second large surface, opposite the first surface, of the thin film-shaped current collector 21, but not to a cross section, a side, or the like.

The positive active material layer 22 may include at least a positive active material and a binder (herein referred to as "a positive active material layer binder"), and may further include a conductive agent. The amount of each of the positive active material, the conductive agent, and the positive active material layer binder are not particularly limited, and may be any amount suitable for application in a non-aqueous electrolyte rechargeable battery.

The positive active material may be, for example, a transition metal oxide including lithium and/or a solid solution oxide, and may be any suitable material capable of electrochemically intercalating and deintercalating lithium ions without particular limitation. The transition metal oxide including lithium may be, for example, a Li. Co-based composite oxide (such as $LiCoO_2$), a Li. Ni.Co.Mn-based composite oxide (such as $LiNi_xCo_yMn_zO_2$), a Li.Ni-based composite oxide (such as $LiNiO_2$), and/or a Li.Mn-based composite oxide (such as $LiMn_2O_4$).

The solid solution oxide may be, for example, $Li_aMn_xCo_yNi_zO_2$ ($1.15 \leq a \leq 1.43$, $0.45 \leq x \leq 0.6$, $0.10 \leq y \leq 0.15$, $0.20 \leq z \leq 28$), $LiMn_xCo_yNi_zO_2$ ($0.3 \leq x \leq 0.85$, $0.10 \leq y \leq 0.3$, $0.10 \leq z \leq 3$), $LiMn_{1.5}Ni_{0.5}O_4$, and/or the like. An amount (content ratio) of the positive active material is not particularly limited, and may be any amount suitable for application in a positive active material layer of a non-aqueous electrolyte rechargeable battery. The compound used as the positive active material may be used alone or in plural mixture of two or more.

The conductive agent may be, for example, carbon black (such as ketjen black and/or acetylene black), natural graphite, artificial graphite, fiber-shaped carbon (such as carbon nanotube, graphene, carbon nanofibers and/or the like) and/or a composite of the fiber-shaped carbon and carbon black. However, the conductive agent is not particularly limited as long as it increases conductivity of the positive electrode. An amount of the conductive agent is not particularly limited, and may be any amount suitable for application in a positive active material layer of a non-aqueous electrolyte rechargeable battery.

The positive active material layer binder may be, for example, a fluorine-containing resin (such as polyvinylidene fluoride and/or the like), a styrene-containing resin (such as a styrene butadiene rubber, and/or the like), an ethylene-propylene-diene terpolymer, an acrylonitrile-butadiene rubber, a fluoroelastomer, polyvinyl acetate, polymethylmethacrylate, polyethylene, polyvinyl alcohol, carboxymethyl cellulose and/or a derivative thereof (for example a salt of carboxyl methyl cellulose), and/or nitrocellulose. The positive active material layer binder is not particularly limited as long as it binds the positive active material and the conductive agent on the current collector 21 and has oxidation resistance to endure a high potential of a positive electrode and electrolyte solution stability. An amount of the positive active material layer binder is not particularly limited, and may be any amount suitable for application in a positive active material layer of a non-aqueous electrolyte rechargeable battery.

The positive active material layer 22 may be, for example, manufactured by dispersing a positive active material, a conductive agent, and/or a binder in an appropriate organic solvent (for example, N-methyl-2-pyrrolidone) to prepare positive electrode slurry and coating the positive electrode slurry on a current collector 21, followed by drying and compressing the same. A density of the positive active material layer 22 after compression is not particularly limited, and may be any density suitable for application in a positive active material layer of a non-aqueous electrolyte rechargeable battery.

The negative electrode 30 is an example of a negative electrode for a rechargeable battery according to the present embodiments.

The negative electrode 30 includes a thin-film current collector 31, a negative active material layer 32 disposed (e.g., positioned) contacting the current collector 31, and a porous insulating layer 33 disposed on the negative active material layer 32.

The current collector 31 is not particularly limited, and may be, for example, made of copper, aluminum, iron, nickel, and/or stainless steel or an alloy thereof or steel plated therewith, for example, nickel-plated steel. In some embodiments, the current collector 31 is made of copper, nickel and/or an alloy thereof.

The negative active material layer 32 may contact the current collector 31, for example, it may contact one main surface of the current collector 31 and be adhered on the current collector 31. The negative active material layer 32 includes at least a negative active material. In the present embodiment, the negative active material layer 32 includes a negative active material and a binder (herein referred to as "a negative active material layer binder").

The negative active material is not particularly limited as long as it is a material capable of electrochemically intercalating and deintercalating lithium ions. For example, the negative active material may be a graphite active material (artificial graphite, natural graphite, a mixture of artificial graphite and natural graphite, and/or natural graphite coated with artificial graphite), a Si-based active material and/or a Sn-based active material (for example, particulates such as silicon (Si) and/or tin (Sn) or oxides thereof, and/or alloys of silicon and/or tin as a basic material), metal lithium, and/or a titanium oxide-based compound such as $Li_4Ti_5O_{12}$. In some embodiments, he negative active material may include at least one of the materials described above. The oxide of silicon may be represented by $SiO_x$ ($0 \leq x \leq 2$).

An amount of the negative active material in the negative active material layer 32 is not particularly limited, and may be, for example, about 60 wt % to about 100 wt %, for example, about 80 wt % to about 99.5 wt %, or about 90 wt % to about 99 wt %.

The negative active material layer binder may be the same as the positive active material layer binder described above. Among the materials, at least one binder material selected from the styrene-containing resin, the fluorine-containing resin, polyethylene, polyvinyl alcohol, and carboxymethyl celluloses may be used. The styrene-containing resin may be a styrene butadiene rubber, and the fluorine-containing resin may be polyvinylidene fluoride. The carboxymethyl celluloses may be selected from carboxymethyl cellulose, and a carboxymethyl cellulose derivative such as a salt of carboxymethyl cellulose.

The salt of carboxymethyl cellulose may be, for example, a salt of carboxymethyl cellulose and an alkali metal ion, for example, sodium carboxyl methyl cellulose, potassium carboxyl methyl cellulose, lithium carboxyl methyl cellulose, and/or the like.

An amount of the negative active material layer binder in the negative active material layer 32 is not particularly limited, and may be, for example, about 0 to about 40 wt %, for example, about 0.5 to about 20 wt %, or about 1 to about 10 wt %.

The negative active material layer 32 may be manufactured by, for example, dispersing the negative active material and the negative active material layer binder in an appropriate solvent (e.g., water, etc.) to prepare negative electrode slurry and coating the negative electrode slurry on the current collector 31, followed by drying and compressing the same. A thickness of the negative active material layer 32 after compression is not particularly limited, and may be any thickness suitable for application in a negative active material layer of a lithium ion rechargeable battery. The negative active material layer 32 may optionally include a graphite active material.

In some embodiments, the negative active material layer 32 may be manufactured by a physical deposition method and/or a chemical deposition method (such as thermal evaporation, ion plating, sputtering and/or the like), besides the above-described method.

The porous insulating layer 33 may be formed on the negative active material layer 32 so as to be disposed (e.g., positioned) between the negative electrode 30 and the separator layer 40. The porous insulating layer 33 may prevent or reduce the short-circuit of the non-aqueous electrolyte rechargeable battery 10. In the present embodiment, the porous insulating layer 33 is manufactured by coating the composition for forming the porous insulating layer and drying the same. In some embodiments, the porous insulating layer includes, for example, the insulating inorganic particle and the porous insulating layer binder, and, optionally, the polyolefin-based polymer particle. The insulating inorganic particle, the porous insulating layer binder, and the polyolefin-based polymer particle may be the same as described above.

The separator layer 40 may include a separator and an electrolyte solution. The separator is not particularly limited, and any suitable separator of a lithium ion rechargeable battery may be used. The separator may be a porous film or a non-woven fabric having excellent (or suitable) high rate discharge performance alone or in a combination thereof. The separator may be coated with an inorganic material such as $Al_2O_3$, $Mg(OH)_2$, $SiO_2$, and/or the like, and the inorganic material may be included as a filler.

Materials constituting the separator may include, for example, a polyolefin-based resin (such as polyethylene, polypropylene and/or the like), a polyester-based resin (such as polyethylene terephthalate, polybutylene terephthalate, and/or the like), polyvinylidene fluoride, a vinylidene fluoride-hexafluoro propylene copolymer, a vinylidene fluoride-perfluoro vinyl ether copolymer, a vinylidene fluoride-tetrafluoro ethylene copolymer, a vinylidene fluoride-trifluoro ethylene copolymer, a vinylidene fluoride-fluoro ethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoro ethylene-hexafluoro propylene copolymer, a vinylidene fluoride-ethylene-tetrafluoro ethylene copolymer, and/or the like. A porosity of the separator is not particularly limited, and any suitable porosity of a separator for a conventional lithium ion rechargeable battery may be applied.

The electrolyte solution may include an electrolytic salt and a solvent.

The electrolytic salt may be any salt suitable for application in a lithium ion battery, without particular limitation. For example, the electrolytic salt may include an inorganic ion salt including at least one selected from lithium (Li), sodium (Na), and potassium (K) (such as $LiClO_4$, $LiBF_4$, $LiAsF_6$, $LiPF_6$, LiSCN, LiBr, LiI, $Li_2SO_4$, $Li_2B_{10}$ $NaClO_4$, NaI, NaSCN, NaBr, $KClO_4$, KSCN, and/or the like), and/or an organic ion salt (such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octyl sulfonate, lithium dodecyl benzenesulfonate, and/or the like), and the electrolytic salt may be used alone or as a mixture of two or more. In some embodiments, the electrolytic salt may include a lithium salt.

A concentration of the electrolytic salt is not particularly limited, and may be, for example, about 0.5 to about 2.0 mol/L.

The solvent is a non-aqueous solvent that dissolves the electrolytic salt. The solvent may be selected from, for example, cyclic carbonate esters (such as propylene carbonate, ethylene carbonate, butylene carbonate, chloro ethylene carbonate, vinylene carbonate, and/or the like), cyclic esters (such as γ-butyrolactone, γ-valero lactone, and/or the like), linear carbonates (such as dimethyl carbonate, diethyl carbonate, ethylmethyl carbonate, and/or the like), linear esters (such as methyl formate, methyl acetate, methyl butyrate, and/or the like), tetrahydrofuran or a derivative thereof, ethers (such as 1,3-dioxane, 1,4-dioxane, 1,2-dimethoxy ethane, 1,4-dibutoxyethane or methyl diglyme, and/or the like), nitriles (such as acetonitrile, benzonitrile, and/or the like), dioxolane or a derivative thereof, ethylene sulfide, sulfolane, sultone, and/or any derivative thereof, which may be used alone or as a mixture of two or more. When the solvent is used as a mixture of two or more, a mixing ratio of each solvent may be any mixing ratio suitable for application in a lithium ion rechargeable battery.

In some embodiments, the electrolyte solution may include various additives such as a negative electrode SEI (Solid Electrolyte Interface) forming agent, a surfactant, and/or the like. Such additives may be, for example, succinic anhydride, lithium bis(oxalate)borate, lithium tetrafluoroborate, a dinitrile compound, propane sultone, butane sultone, propene sultone, 3-sulfolene, fluorinated arylether, fluorinated acrylate, and/or the like. Concentrations of one or more of the additives may be any suitable additive concentrations for application in a lithium ion rechargeable battery.

In the present embodiment, the non-aqueous electrolyte rechargeable battery 10 may utilize the composition for forming the porous insulating layer according to the present embodiment during manufacture of the porous insulating layer 33 of the negative electrode 30. Accordingly, layer thickness increase of the negative active material layer 32 may be suppressed or reduced.

In the present embodiments, the negative electrode 30 includes the porous insulating layer 33, but the present disclosure is not limited thereto. For example, the positive electrode 20 may include the porous insulating layer. In this case, a layer thickness increase of the positive active material layer 22 of the positive electrode 20 may be suppressed or reduced. In this case, the negative electrode 30 may not include the porous insulating layer.

Method of Manufacturing Non-Aqueous Electrolyte Rechargeable Battery

Next, an embodiment of a method of manufacturing a non-aqueous electrolyte rechargeable battery 10 is described. A method of manufacturing a non-aqueous electrolyte rechargeable battery 10 according to the present embodiment includes forming a porous insulating layer using the composition for forming the porous insulating layer on an active material layer disposed on a main surface of a current collector. However, the method of manufacturing a non-aqueous electrolyte rechargeable battery 10 is not limited to the following method and may include any suitable manufacturing method.

The positive electrode 20 may be manufactured as follows. First, a positive active material, a conductive agent, and a positive active material layer binder are mixed in a desirable (or suitable) ratio and then dispersed in an organic solvent (for example, N-methyl-2-pyrrolidone) to prepare positive electrode slurry. Next, the positive electrode slurry is formed (for example, coated) on the current collector 21 and dried to manufacture a positive active material layer 22. Herein, the method of coating has no particular limit, but may be performed by using, for example, a knife coater, a gravure coater, and/or the like. When the method involves two or more coatings, each coating may be performed utilizing the same method. The positive active material layer 22 may be compressed with a press to a desirable or suitable thickness. Thus, the positive electrode 20 is manufactured. Herein, a thickness of the positive active material layer 22 is not particularly limited and may be any thickness of a positive active material layer that is suitable for application in a non-aqueous electrolyte rechargeable battery.

The negative electrode 30 may be manufactured by substantially the same method as the method of manufacturing the positive electrode 20. First, the negative active material and the negative active material layer binder are mixed in a desirable (or suitable) ratio to disperse them in a solvent (for example, water) and to prepare negative electrode slurry. In some embodiments, the negative electrode slurry may optionally include a graphite active material. Subsequently, the negative electrode slurry is formed (for example, coated) on the current collector 31, and then dried to manufacture a negative active material layer 32. The negative active material layer 32 may be compressed with a press to a desirable or suitable thickness. Herein, a thickness of the negative active material layer 32 is not particularly limited and may be any thickness of a negative active material layer suitable for application in a non-aqueous electrolyte rechargeable battery. Then, a porous insulating layer 33 is formed using the composition for forming the porous insulating layer. For example, the composition for forming the porous insulating layer is coated on the negative active material layer 32 and dried to form the porous insulating layer 33. Thus, the negative electrode 30 is manufactured. When the porous insulating layer 33 is formed using the composition for forming the porous insulating layer according to the present embodiment, thereby swelling of the negative active material layer 32 may be suppressed or reduced during coating the composition for forming the porous insulating layer. As a result, a thickness increase of the negative electrode 30 may be prevented or reduced.

Subsequently, the separator 40 is disposed between the positive electrode 20 and the negative electrode 30 to manufacture an electrode structure. Then, the electrode structure is shaped to have a desired shape (for example, a cylinder, a prism, a laminate, a button shape, and/or the like) and then inserted into a container having the shape. The electrolyte solution is then injected into the container and impregnated into each pore in the separator 40. Thus, the non-aqueous electrolyte rechargeable battery 10 is manufactured.

In the present embodiment, the porous insulating layer 33 is formed on the negative active material layer 32, but the present disclosure is not limited thereto. For example, a porous insulating layer may be formed on the positive active material layer 22 using the composition for forming the porous insulating layer. In this case, it is not necessary that a porous insulating layer is formed on the negative active material layer 32.

EXAMPLES

Hereinafter, the present disclosure is described with reference to certain examples in more detail.

However, the following examples are provided for illustrative purposes and the present disclosure is not limited to the following examples.

Synthesis of Binder for Porous Insulating Layer
Synthesis of Binder 1

70.6 mg of azoisobutyro nitrile, 10.0 g of N-vinyl formamide, 9.5 g of acryloyl morpholine, and 0.5 g of acrylic acid were put in a 500 ml flask equipped with an agitator and a thermometer and then, stirred, and 180.0 g of triethylene glycol monomethyl ether and 0.424 g of ethanol amine were sequentially mixed therewith. After substituting nitrogen inside the system, the obtained mixture was heated up to 65° C. and reacted for 12 hours while stirred at 600 rpm. After the reaction was complete, non-volatile components in the solution were measured to be 9.7 wt % (conversion rate: 96%). Subsequently, an initiator residue and a nonreaction monomer were removed from the solution after the reaction through heating and distillation under a reduced pressure. The resulting solution was cooled down to room temperature, and ethanol amine was added thereto to adjust to pH 8, thus preparing a copolymer solution. A solid content therein was 10%.

Synthesis of Binder 2

A 10% copolymer solution was synthesized according to substantially the same method as the synthesis of Binder 1 except for changing the solvent of Binder 1 from triethylene glycol monomethyl ether to diethylene glycol monomethyl ether.

Synthesis of Binder 3

A 10% copolymer solution was synthesized according to substantially the same method as the synthesis of Binder 1, except for putting 8.0 g of N-vinyl formamide, 11.0 g of acryloyl morpholine, and 1.0 g of acrylic acid in a flask and stirring them and then, sequentially adding 180.0 g of triethylene glycol monomethyl ether and 0.848 g of ethanol amine thereto.

Synthesis of Binder 4

A copolymer aqueous solution was synthesized according to substantially the same method as the synthesis of Binder 1 except for putting 10.0 g of N-vinyl formamide, 4.9 g of acryloyl morpholine, 0.5 g of acrylic acid, and 4.6 g of tetrahydrofuranyl acrylate in a flask and stirring them and then, sequentially adding 180.0 g of diethylene glycol monomethyl ether and 0.424 g of ethanol amine thereto.

Synthesis of Binder 5

A a copolymer aqueous solution was synthesized according to substantially the same method as the synthesis of Binder 1 except for putting 14.0 g of acryloyl morpholine and 6.0 g of acrylic acid in a flask and stirring them and then, sequentially adding 180.0 g of diethylene glycol monomethyl ether and 5.088 g of ethanol amine thereto.

Synthesis of Binder 6

A copolymer aqueous solution was obtained according to substantially the same as the synthesis of Binder 1 except for putting 19.0 g of acryloyl morpholine and 1.0 g of acrylic acid in a flask and stirring them and then, sequentially adding 180.0 g of diethylene glycol monomethyl ether and 0.848 g of ethanol amine thereto.

Synthesis of Binder 8

12.0 g of 2-ethyl hexyl acrylate, 22.0 g of isobornyl acrylate, 4.0 g of acrylo nitrile, 2.0 g of methacrylic acid, 0.8 g of sodium dodecyl benzene sulfonate, and 115 g of ion exchange water were put in a 500 ml flask equipped with an agitator and a thermometer and then, stirred. Nitrogen was substituted in the flask, and the mixture was heated up to 70° C., while being stirred at 600 rpm. When the temperature reached 70° C., a solution prepared by dissolving 0.27 g of potassium persulfate in 5.0 g of ion exchange water was added thereto, and the mixture was reacted for 12 hours. After the reaction was complete, when non-volatile components (solid content) of the obtained aqueous dispersion were measured, the result was 25.0 wt % (conversion rate: 100%). Subsequently, the reaction solution was concentrated up to 40 wt % of the non-volatile components through heating and distillation under a reduced pressure, and 200 ml of ethanol was added thereto to precipitate and separate a solid. The solid was recovered, twice washed with 100 ml of ethanol, and dried under a reduced pressure at 80° C. for 10 hours, 460 g of 2-ethyl hexanol was added thereto, and the mixture was stirred at room temperature to obtain a copolymer solution. A solid content therein was 8%.

Synthesis of Binder 9

A copolymer solution was obtained according to substantially the same method as the synthesis of Binder 5 except for using 3-methoxy-3-methyl-1-butanol instead of diethylene glycol monomethyl ether.

Manufacture of Electrode

A negative electrode slurry was prepared by mixing artificial graphite (scale-type assembly, specific surface area: 1.7 $m^2/g$, and average particle diameter: 15 μm), sodium carboxyl methyl cellulose salt, and a styrene butadiene-based aqueous dispersion solid in a mass ratio of 97.5:1.0:1.5 and then, dissolving and dispersing the obtained mixture in a water solvent. Subsequently, the negative electrode slurry was coated to be 10 μm thick on both surfaces of a copper foil current collector, dried, and compressed with a roll press to manufacture a negative electrode having a negative active material layer on the copper foil current collector. A coating amount of the negative electrode was 26 mg/$cm^2$ (on both surfaces) and an electrode density was 1.65 g/$cm^3$. Herein, the negative active material layer used styrene butadiene rubber and carboxymethyl cellulose as a binder.

Preparation of Composition for Forming Porous Insulating Layer

Example 1

Ion exchange water in the same amount as that of triethylene glycol monomethyl ether included in the Synthesis of Binder 1 was added to Binder 1 to prepare a mixed solvent solution including the triethylene glycol monomethyl ether and the ion exchange water in a mass ratio of 1:1 (solid content: 5.3%). This mixed solvent solution was mixed with boehmite particles having an average particle diameter (D50) of 0.9 μm in a solid weight ratio of 5:45, which were dispersed with a beads mill to obtain an aqueous dispersion (solid content: 35.7%). In addition, triethylene glycol monomethyl ether in the same amount as that of water included in an aqueous dispersion of polyethylene wax (an average particle diameter: 1 μm, a solid content: 40%) was slowly added to the aqueous dispersion and stirred therewith to prepare a mixed solvent dispersion of polyethylene wax (solid content: 25.0%). The above-obtained aqueous dispersion was mixed with the mixed solvent dispersion of polyethylene wax in a weight ratio of 28:36 and then, stirred therewith with a planetary mixer to prepare a composition for forming a porous insulating layer (final solid content: 30%).

This composition for forming a porous insulating layer was coated to be 3 μm thick on each surface of the negative active material layer of the negative electrode with a wire bar and then, dried. The drying was performed in a 60° C. oven for 15 minutes. Each thickness of the negative active material layer of the negative electrode having the porous insulating layer was measured and compared with each thickness of the negative active material layer before forming the porous insulating layer, to calculate a thickness increase per each surface.

The thicknesses of the negative active material layer and the porous insulating layer were measured by processing a cross section of the electrode with a low temperature cross-sectional polisher and examining them with a scanning electron microscope (SEM) to average each thickness measurements at 10 points.

Table 1 shows an HSP distance between triethylene glycol monomethyl ether and a negative active material layer binder, a boiling point of the triethylene glycol monomethyl ether, and a thickness change of a negative active material layer (referred to in the Table as "an active material layer"). The HSP of the triethylene glycol monomethyl ether was cited from Hansen Solubility Parameter in Practice (4th Edition). The HSP of the negative active material layer binder was experimentally obtained in the above method by using a solvent having a known HSP. These measurements were taken in the same manner for the solvents and negative active material layer binders of other examples and comparative examples. The HSP of a negative active material (graphite) used the HSP of graphene described in Langmuir (2008); 24;pp. 10560-4.

Example 2

A composition for forming a porous insulating layer was prepared according to substantially the same method as in Example 1, except for changing Binder 1 into Binder 2 and using diethylene glycol monomethyl ether instead of the triethylene glycol monomethyl ether used in Example 1. The composition was then coated on the negative electrode.

Example 3

Binder 3 was mixed with boehmite particles having an average particle diameter (D50) of 0.9 μm in a solid mass ratio of 5:95, and triethylene glycol monomethyl ether was added thereto to have a solid content of 30%. Subsequently, the obtained mixture was dispersed with a beads mill to prepare a composition for forming a porous insulating layer (solvent: triethylene glycol monomethyl ether). Then, the composition was coated on the negative electrode according to substantially the same method as in Example 1.

Example 4

Binder 4 was mixed with boehmite particles having an average particle diameter (D50) of 0.9 μm in a solid mass ratio of 5:95, and diethylene glycol monomethyl ether was added thereto to have a solid content of 30%. Subsequently, the obtained mixture was dispersed with a beads mill to prepare a composition for forming a porous insulating layer (solvent: diethylene glycol monomethyl ether). Then, the composition was coated on the negative electrode according to substantially the same method as in Example 1.

Example 5

Binder 5 was mixed with boehmite particles having an average particle diameter (D50) of 0.9 μm in a solid mass ratio of 5:95, and diethylene glycol monomethyl ether was added thereto to have a solid content of 30%. Subsequently, the obtained mixture was dispersed with a beads mill to prepare a composition for forming a porous insulating layer (solvent: diethylene glycol monomethyl ether). Then, the composition was coated on the negative electrode according to substantially the same method as in Example 1.

Example 6

Binder 6 was mixed with boehmite particles having an average particle diameter (D50) of 0.9 μm in a solid mass ratio of 5:95, and 2-ethoxy ethanol (ethylene glycol monoethyl ether) was added thereto to have a solid content of 30%. Subsequently, the obtained mixture was dispersed with a beads mill to prepare a composition for forming a porous insulating layer (solvent: 2-ethoxy ethanol). Then, the composition was coated on the negative electrode according to substantially the same method as in Example 1.

Example 7

A vinyl butyral-vinyl alcohol-vinyl acetate copolymer having a weight average molecular weight of 70,000 to 100,000 (Sigma-Aldrich Co., Ltd.) as Binder 7 was mixed with boehmite particles having an average particle diameter (D50) of 0.9 μm in a solid mass ratio of 5:95, and 1-butanol was added thereto to have a solid content of 30%. Subsequently, the mixture was dispersed with a beads mill to prepare a composition for forming a porous insulating layer (solvent: 1-butanol). Then, the composition was coated on the negative electrode according to substantially the same method as in Example 1.

Example 8

A composition for forming a porous insulating layer was prepared according to substantially the same method as Example 7 except for using 3-methoxy-1-butanol instead of the 1-butanol. Then, the composition was coated on the negative electrode according to substantially the same method as in Example 1.

Example 9

A composition for forming a porous insulating layer was prepared according to substantially the same method as in Example 7 except for using 2-ethyl-1-hexanol instead of 1-butanol. Then, the composition was coated on the negative electrode according to substantially the same method as in Example 1.

Example 10

Binder 8 was mixed with boehmite particles having an average particle diameter (D50) of 0.9 μm in a solid mass ratio of 5:95, and 2-ethyl-1-hexanol was added thereto to have a solid content of 30%. Subsequently, the obtained mixture was dispersed with a beads mill to prepare a composition for forming a porous insulating layer (solvent: 2-ethyl-1-hexanol). Then, the composition was coated on the negative electrode according to substantially the same method as in Example 1.

Example 11

A composition for forming a porous insulating layer was prepared according to substantially the same method as in Example 7 except for using 1-hexanol instead of 1-butanol. Then, the composition was coated on the negative electrode according to substantially the same method as in Example 1.

Example 12

A composition for forming a porous insulating layer was prepared according to substantially the same method as in Example 7 except for using 3-methoxy-3-methyl-1-butanol instead of the 1-butanol. Then, the composition was coated on the negative electrode according to substantially the same method as in Example 1.

Example 13

Binder 9 was mixed with boehmite particles having an average particle diameter (D50) of 0.9 μm in a solid mass ratio of 5:95, and 3-methoxy-3-methyl-1-butanol was added thereto to have a solid content of 30%. Subsequently, the obtained mixture was dispersed with a beads mill to prepare a composition for forming a porous insulating layer (solvent: 3-methoxy-3-methyl-1-butanol). Then, the composition was coated on the negative electrode according to substantially the same method as in Example 1.

Example 14

A composition for forming a porous insulating layer was prepared according to substantially the same method as in Example 7 except for using 1-heptanol instead of the 1-butanol. Then, the composition was coated on the negative electrode according to substantially the same method as in Example 1.

Example 15

Binder 9 was mixed with boehmite particles having an average particle diameter (D50) of 0.9 μm in a solid mass ratio of 5:45, 3-methoxy-3-methyl-1-butanol was added thereto to have a solid content of 45%, and the mixture was dispersed with a beads mill to prepare a boehmite dispersion. In addition, high-density oxidized polyethylene wax was added to 3-methoxy-3-methyl-1-butanol to have a solid content of 15%, and the mixture was stirred with a homogenizer and dispersed with a beads mill to prepare a polyethylene wax dispersion. The boehmite dispersion was mixed with the polyethylene wax dispersion in a solid mass ratio of 50:50 (Binder 9 : boehmite particle : high-density oxidized polyethylene wax=5:45:50), and the resulting mixture was stirred with a planetary mixer to prepare a composition for forming a porous insulating layer (solvent: 3-methoxy-3-methyl-1-butanol, a solid content of 22.5%). Then, the composition was coated on the negative electrode according to substantially the same method as in Example 1.

Example 16

Binder 8 was mixed with boehmite particles having an average particle diameter (D50) of 0.9 μm in a solid mass ratio of 5:45, 2-ethyl-1-hexanol was added thereto to have a solid content of 45%, and the obtained mixture was dispersed to prepare a boehmite dispersion. In addition, high-density oxidized polyethylene wax was added to 2-ethyl-1-hexanol to have a solid content of 15%, and the mixture was stirred with a homogenizer and dispersed with a beads mill to prepare a polyethylene wax dispersion.

The boehmite dispersion was mixed with the polyethylene wax dispersion in a solid mass ratio of 50:50 (Binder 9 : boehmite particle : high-density oxidized polyethylene wax=5:45:50), and the resulting mixture was stirred with a planetary mixer to prepare a composition for forming a porous insulating layer (solvent: 2-ethyl-1-hexanol, a solid content: 22.5%). Subsequently, the composition was coated on the negative electrode according to substantially the same method as in Example 1.

Comparative Example 1

A composition for forming a porous insulating layer having a solid content of 30% (solvent: NMP) was prepared according to substantially the same method as in Example 3 except for using an acryl-based rubber N-methyl-2-pyrrolidone (NMP) solution instead of Binder 1. Subsequently, the composition was coated on the negative electrode according to substantially the same method as in Example 1.

In Table 1, "SBR" denotes a styrene butadiene rubber, "CMC" denotes carboxymethyl cellulose, "NVf" denotes N-vinyl formamide, "ACMO" denotes acryloyl morpholine, "AA" denotes acrylic acid, "MAA" denotes methacrylic acid, "THFA" denotes tetrahydrofuranyl acrylate, "2EHA" denotes 2-ethylhexyl acrylate, "'BOA" denotes isobornyl acrylate, "VA" denotes vinyl alcohol, "VB" denotes vinyl butyrate, "VAc" denotes vinyl acetate, and "AN" denotes acrylo nitrile, respectively.

TABLE 1

| | | Solvent 1 | | | | | Binder for porous insulating layer | | Thickness increase of active material layer (negative electrode layer) |
|---|---|---|---|---|---|---|---|---|---|
| | | Melting point | HSP distance with binder (SBR) | HSP distance with binder (CMC) | HSP distance with active material | Solvent 2 | Polyolefin-based polymer particle | | |
| | Kinds | (° C.) | (MPa)$^{1/2}$ | (MPa)$^{1/2}$ | (MPa)$^{1/2}$ | Kinds | | Kinds | Composition | (μm) |
| Ex. 1 | triethylene glycol monomethyl ether | 249 | 8.8 | 13.0 | 6.2 | Water | Yes | Binder 1 | NVf/ACMO/AA = 50/47.5/2.5 | 4.7 |
| Ex. 2 | diethylene glycol monomethyl ether | 194 | 8.9 | 12.8 | 6.3 | Water | Yes | Binder 2 | NVf/ACMO/AA = 50/47.5/2.5 | 6.1 |
| Ex. 3 | triethylene glycol monomethyl ether | 249 | 8.8 | 13.0 | 6.2 | — | — | Binder 3 | NVf/ACMO/AA = 40/55/5 | 3.4 |
| Ex. 4 | diethylene glycol monomethyl ether | 194 | 8.9 | 12.8 | 6.3 | — | — | Binder 4 | NVf/ACMO/THFA/AA = 50/24.5/23/2.5 | 4.3 |
| Ex. 5 | diethylene glycol monomethyl ether | 194 | 8.8 | 12.8 | 6.3 | — | — | Binder 5 | ACMO/AA = 70/30 | 4.2 |
| Ex. 6 | ethylene glycol monoethyl ether | 134 | 10.3 | 12.2 | 7.9 | — | — | Binder 6 | ACMO/AA = 95/5 | 4.5 |
| Ex. 7 | 1-butanol | 118 | 11.7 | 11.5 | 9.7 | — | — | Binder 7 | VB/VA/AVc | 2.8 |
| Ex. 8 | 3-methoxy-1-butanol | 158 | 10.6 | 13.9 | 8.9 | — | — | Binder 7 | VB/VA/AVc | 3.1 |
| Ex. 9 | 2-ethyl-1-hexanol | 184 | 8.9 | 15.8 | 8.4 | — | — | Binder 7 | VB/VA/AVc | 3.0 |
| Ex. 10 | 2-ethyl-1 hexanol | 184 | 8.9 | 15.8 | 8.4 | — | — | Binder 8 | 2EHA/IBOA/AN/MAA = 30/55/10/5 | 2.9 |
| Ex. 11 | 1-hexanol | 157 | 9.0 | 14.0 | 7.3 | — | — | Binder 7 | VB/VA/AVc | 4.3 |
| Ex. 12 | 3-methoxy-3-methyl-1-butanol | 174 | 9.2 | 13.3 | 7.2 | — | — | Binder 7 | VB/VA/AVc | 4.2 |
| Ex. 13 | 3-methoxy-3-methyl-1-butanol | 174 | 9.2 | 13.3 | 7.2 | — | — | Binder 9 | ACMO/AA = 70/30 | 4.6 |
| Ex. 14 | 1-heptanol | 176 | 8.3 | 14.8 | 6.9 | — | — | Binder 7 | VB/VA/AVc | 4.6 |
| Ex. 15 | 3-methoxy-3-methyl-1-butanol | 174 | 9.2 | 13.3 | 7.2 | — | Yes | Binder 9 | ACMO/AA = 70/30 | 4.8 |
| Ex. 16 | 2-ethyl-1-hexanol | 184 | 8.9 | 15.8 | 8.4 | — | Yes | Binder 8 | 2EHA/IBOA/AN/MAA = 30/55/10/5 | 3.1 |
| Comp. Ex. 1 | N-methyl-2-pyrrolidone | 202 | 6.6 | 16.3 | 3.0 | — | — | Acrylic rubber | | 8.8 |

As shown in Table 1, when each composition for forming a porous insulating layer according to Examples 1 to 16 was used to form a porous insulating layer, a thickness increase of an active material layer was suppressed or reduced, as compared with the composition for forming the porous insulating layer according to Comparative Example 1. Particularly, each composition for forming a porous insulating layer not including water as a solvent according to Examples 3 to 16 shows a large (significant) effect of suppressing or reducing a thickness increase of an active material layer.

In addition, the compositions according to Examples 1 to 16 have an HSP distance of greater than or equal to 5.0 (MPa)$^{1/2}$ from an active material, but when each composition for forming a porous insulating layer having an HSP distance of 8.0 (MPa)$^{1/2}$ according to Examples 7 to 10 and 16 was formed into a porous insulating layer, a thickness increase of an active material layer was more suppressed or reduced, as compared with the remaining compositions.

As used herein, expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinbefore, example embodiments of the present disclosure were illustrated by referring to the accompanied drawing, but the present invention is not limited thereto. While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and equivalents thereof.

DESCRIPTION OF SYMBOLS

10: non-aqueous electrolyte rechargeable battery
20: positive electrode
21: positive current collector
22: positive active material layer
30: negative electrode
31: negative current collector
32: negative active material layer
33: porous insulating layer
40: separator layer

What is claimed is:

1. A composition for forming a porous insulating layer on an active material layer on a main surface of a current collector,
the composition for forming the porous insulating layer comprising a solvent and an insulating inorganic particle, the solvent comprising an organic solvent,
wherein a distance between Hansen solubility parameters of an active material layer binder and the organic solvent is greater than or equal to about 8.0 MPa$^{1/2}$, and
wherein the active material layer comprises an active material capable of electrochemically intercalating and deintercalating lithium ions and the active material layer binder.

2. The composition of claim 1, wherein a distance between Hansen solubility parameters of the active material and the organic solvent is greater than or equal to about 5.0 MPa$^{1/2}$.

3. The composition of claim 1, wherein a distance between Hansen solubility parameters of the active material and the organic solvent is greater than or equal to about 8.0 MPa$^{1/2}$.

4. The composition of claim 1, wherein a distance (Ra) between Hansen solubility parameters of graphene and the organic solvent is represented by Equation 1, and is greater than or equal to about 5.0 MPa$^{1/2}$:

$$Ra = \{4 \times (18.0 - \delta_{D(solvent)})^2 + (9.3 - \delta_{P(solvent)})^2 + (7.7 - \delta_{H(solvent)})^2\}^{1/2}. \quad \text{Equation 1}$$

wherein, in Equation 1, $\delta_{D(solvent)}$ denotes dispersion force of the organic solvent in (MPa)$^{1/2}$, $\delta_{P(solvent)}$ denotes polarity force of the organic solvent in (MPa)$^{1/2}$, and $\delta_{H(solvent)}$ denotes a hydrogen bond force of the organic solvent in (MPa)$^{1/2}$.

5. The composition of claim 1, wherein the composition for forming the porous insulating layer further comprises a porous insulating layer binder.

6. The composition of claim 1, wherein the solvent comprises water.

7. The composition of claim 1, wherein a boiling point of the organic solvent at 1 atm is greater than or equal to about 160° C.

8. The composition of claim 1, wherein the organic solvent comprises an alcohol-based compound.

9. The composition of claim 1, wherein the organic solvent comprises a glycolalkyl ether-based compound.

10. The composition of claim 1, wherein the composition for forming the porous insulating layer further comprises a polyolefin-based polymer particle.

11. An electrode for a non-aqueous electrolyte rechargeable battery, the electrode comprising:
the current collector,
the active material layer on the main surface of the current collector, and
a porous insulating layer formed on the active material layer by utilizing the composition for forming the porous insulating layer of claim 1.

12. A non-aqueous electrolyte rechargeable battery comprising the electrode for a non-aqueous electrolyte rechargeable battery of claim 11.

13. A method for manufacturing an electrode for a non-aqueous electrolyte rechargeable battery, the method comprising:
forming a porous insulating layer utilizing a composition for forming a porous insulating layer on an active material layer on a main surface of a current collector,
wherein the active material layer comprises at least an active material capable of electrochemically intercalating and deintercalating lithium ions and an active material layer binder,
the composition for forming the porous insulating layer comprises at least a solvent and an insulating inorganic particle, the solvent comprising an organic solvent, and
a distance between Hansen solubility parameters of the active material layer binder and the organic solvent is greater than or equal to about 8.0 MPa$^{1/2}$.

* * * * *